(12) United States Patent
Mishra et al.

(10) Patent No.: US 11,516,242 B2
(45) Date of Patent: Nov. 29, 2022

(54) VIRTUAL PATCHING IN A LABEL-BASED SEGMENTED NETWORK ENVIRONMENT

(71) Applicant: Illumio, Inc., Sunnyvale, CA (US)

(72) Inventors: Rupesh Kumar Mishra, Santa Clara, CA (US); Pritesh Kothari, Fremont, CA (US)

(73) Assignee: Illumio, Inc., Sunnyvale, CA (US)

( * ) Notice: Subject to any disclaimer, the term of this patent is extended or adjusted under 35 U.S.C. 154(b) by 382 days.

(21) Appl. No.: 16/553,137

(22) Filed: Aug. 27, 2019

(65) Prior Publication Data

US 2021/0067538 A1 Mar. 4, 2021

(51) Int. Cl.
*G06F 17/00* (2019.01)
*H04L 9/40* (2022.01)
*H04L 47/20* (2022.01)
*G06F 8/65* (2018.01)
*H04L 67/561* (2022.01)
*H04L 67/563* (2022.01)

(52) U.S. Cl.
CPC ............ *H04L 63/1433* (2013.01); *G06F 8/65* (2013.01); *H04L 47/20* (2013.01); *H04L 63/0236* (2013.01); *H04L 63/0263* (2013.01); *H04L 63/0281* (2013.01); *H04L 67/561* (2022.05); *H04L 67/563* (2022.05)

(58) Field of Classification Search
CPC . H04L 67/34; H04L 63/0281; H04L 63/1416; H04L 63/1433; H04L 63/0263; H04L 63/0227; H04L 41/12; H04L 41/0893; H04L 43/10; H04L 49/00; H04L 63/0236; G06F 9/455; G06F 21/62; G06F 21/604
See application file for complete search history.

(56) References Cited

U.S. PATENT DOCUMENTS

| | | | |
|---|---|---|---|
| 6,728,885 B1 * | 4/2004 | Taylor | H04L 63/0263 709/238 |
| 7,073,198 B1 * | 7/2006 | Flowers | H04L 63/1433 713/151 |
| 7,761,917 B1 * | 7/2010 | Kumar | H04L 63/0263 726/23 |
| 7,937,756 B2 * | 5/2011 | Kay | H04L 49/00 713/168 |
| 9,154,479 B1 * | 10/2015 | Sethi | H04L 63/0227 |
| 9,300,691 B1 * | 3/2016 | Banerjee | H04L 41/0893 |
| 2003/0041130 A1 * | 2/2003 | Harrisville-Wolff | H04L 67/16 709/221 |

(Continued)

*Primary Examiner* — Dustin Nguyen
(74) *Attorney, Agent, or Firm* — Fenwick & West LLP (57) ABSTRACT

A segmentation server configures and distributes rules for enforcing a segmentation policy that includes one or more virtual patches. The rules including the virtual patches are enforced by distributed enforcement modules that may execute on host devices or on network devices upstream from the host devices. An enforcement module enforces the rules using traffic filters that filter traffic based on network layer data. To implement a virtual patch, the traffic filters are configured to redirect traffic to or from an application being patched to a transparent application proxy. The transparent application proxy implements an application layer filter that filters traffic based on application layer data to block specific types of traffic associated with a vulnerability addressed by the virtual patch.

20 Claims, 8 Drawing Sheets

(56) References Cited

U.S. PATENT DOCUMENTS

| | | | |
|---|---|---|---|
| 2007/0056030 A1* | 3/2007 | Kay | H04L 63/1416 726/11 |
| 2008/0040790 A1* | 2/2008 | Kuo | G06F 21/604 726/12 |
| 2009/0144827 A1* | 6/2009 | Peinado | H04L 63/1433 726/25 |
| 2011/0225646 A1* | 9/2011 | Crawford | H04L 63/0281 726/11 |
| 2017/0153882 A1* | 6/2017 | Gopalakrishnan | H04L 67/34 |
| 2018/0063176 A1* | 3/2018 | Katrekar | H04L 43/10 |
| 2018/0302409 A1* | 10/2018 | Hope | G06F 21/62 |
| 2019/0058722 A1* | 2/2019 | Levin | G06F 9/455 |
| 2019/0141011 A1* | 5/2019 | Basler | H04L 63/0263 |
| 2019/0273718 A1* | 9/2019 | Ahuja | H04L 63/0236 |
| 2020/0241903 A1* | 7/2020 | Wang | H04L 41/12 |

\* cited by examiner

VIRTUAL PATCHING IN A LABEL-BASED SEGMENTED NETWORK ENVIRONMENT

BACKGROUND

Technical Field

This application relates generally to application security, and more specifically, to virtual patching of applications in a segmented network environment.

Description of Related Art

A segmentation policy comprises a set of rules that control which workloads may communicate on a network and may place restrictions on how such workloads may communicate. To enforce the segmentation policy, distributed firewalls executing on hosts receive management instructions for enforcing respective rules of the segmentation policy. The firewalls filter traffic based on the respective IP addresses and ports of the source and destination to enforce the rules. In many cases it is desirable to block only certain types of malicious traffic to or from an application without necessarily blocking all traffic to or from the application. For example, in application having a known vulnerability, it may be desirable to block traffic operating to exploit the vulnerability without completely isolating the application from the network. However, conventional segmentation systems do not provide this capability.

SUMMARY

A system, non-transitory computer-readable storage medium, and method is provided for configuring an enforcement module on a host device to enforce a segmentation policy that includes a virtual patch for patching an application to protect against one or more security vulnerabilities. An enforcement module receives, from a segmentation server, management instructions for enforcing a segmentation policy that includes applying a virtual patch. A transparent application proxy is instantiated on the host device. A traffic filter is configured based on the instructions to enforce the segmentation policy. The traffic filter filters traffic based on network layer data including source and destination addresses. The traffic filter also includes a filtering rule configured to redirect certain traffic to or from the application to the transparent application proxy. The transparent application proxy is configured to implement an application layer filter that blocks traffic to or from the application exploiting the one or more security vulnerabilities. The traffic filter and the transparent application proxy are applied to enforce the segmentation policy that includes the virtual patch.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A segmentation server configures and distributes rules for enforcing a segmentation policy that includes one or more virtual patches. The rules including the virtual patches are enforced by distributed enforcement modules that may execute on host devices or on network devices upstream from the host devices. An enforcement module enforces the rules using traffic filters that filter traffic based on network layer data. To implement a virtual patch, the traffic filters are configured to redirect traffic to or from an application being patched to a transparent application proxy. The transparent application proxy implements an application layer filter that filters traffic based on application layer data to block specific types of traffic associated with a vulnerability addressed by the virtual patch.

Figure 1:
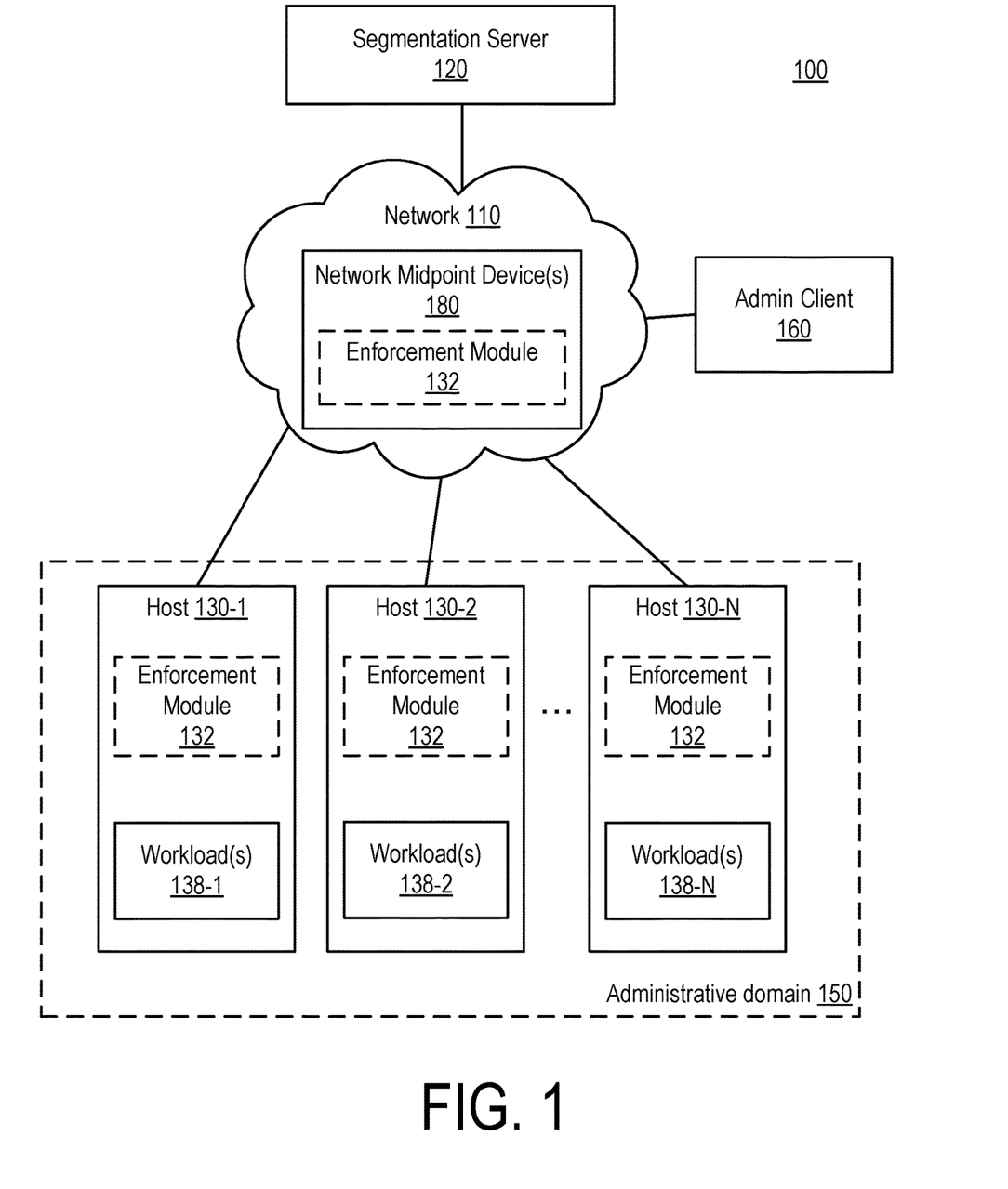
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation server 120, a network 110 including one or more network midpoint devices 180, an administrative client 160, and an administrative domain 150 that includes a plurality of hosts 130 (e.g., hosts 130-1, 130-2, . . . , 130-N). The administrative domain 150 can correspond to a set of devices controlled by an enterprise such as, for example, a service provider, a corporation, a university, or a government agency.

The hosts 130 may each comprise a physical host device, a virtual machine executing on computer system, or an operating system instance executing on a physical host device or virtual machine capable of hosting one or more workloads 138. A single physical or virtual machine may operate a single host 130 or may operate multiple hosts 130. The hosts 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, or other sub-component thereof executing on the host 130. In some instances, a host 130 may operate only a single workload 138. In other instances, a host 130 may operate multiple workloads 138 (e.g., multiple containers) that may be independently addressable and may execute different applications or otherwise perform different independent computing functions. In some embodiments, multiple workloads 138 may operate collectively to execute an application. The workloads 138 on the hosts 130 may communicate with other workloads 138 on different hosts 130 within the administrative domain 150 to perform various tasks.

The network 110 represents the communication pathways between the segmentation server 120, the administrative client 160, and the hosts 130. In one embodiment, the network 110 uses standard communications technologies and/or protocols and can include the Internet. In another embodiment, the entities on the network 110 can use custom and/or dedicated data communications technologies. The network 110 includes one or more network midpoint devices 180 that facilitate communications over the network 110. The network midpoint devices 180 may include, for example, routers, switches, access points, firewall devices, or other devices that control communications between the workloads 138 over the network 110.

The segmentation server 120 is a computer (or set of computers) that obtains and stores information about the hosts 130 on the network 110, the network midpoint devices 180, and the workloads 138 executing on the hosts 130. The segmentation server 120 manages a segmentation policy for the administrative domain 150 that regulates communications between workloads 138 within the administrative domain 150. In an embodiment, the segmentation policy is set forth using permissive rules that specify connections that are permitted. The segmentation policy is enforced by blocking connections that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on a host 130-1 is allowed to provide a particular service to a workload 138-2 operating on a host 130-2. Absent other rules, the workload 138-1 will thus be blocked from providing the service to a workload 138-N operating on a host 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the segmentation server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding host 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the workload within the administrative domain.<br>V: web, API, database |
| Environment | M: The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The segmentation server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The segmentation server 120 may retain a repository storing information about the hosts 130 and the workloads 138 managed by the segmentation server 120. For example, the segmentation server 120 may store workload identifiers that identify the workloads 138, and membership information indicating one or more groups of workloads 138 to which each workload 138 belong (e.g., as defined by the respective label sets for the workloads 138).

Table 2 illustrates an example of information stored by the segmentation server 120. Here, the workload IDs represent the workload identifiers for the workloads 138. The memberships represent groups to which one or more workloads 138 belongs. Each group may correspond to a unique label set involving one or more dimensions.

TABLE 2

Example of a Repository Table

| Workload ID | Memberships |
|---|---|
| ID1 | A, C, D |
| ID2 | B, C |
|  | D |
| . | . |
| . | . |
| . | . |
| IDn | B, D, E, F |

Instead of enforcing the segmentation policy at a centralized device, the segmentation policy is instead enforced in a distributed manner by at least a subset of the hosts 130 and/or the network midpoint devices 180. To enable enforcement of the segmentation policy, the segmentation server 120 generates a set of management instructions and distributes the management instructions to enforcement modules 132 that may be executed on the hosts 130 or on the network midpoint devices 180. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different enforcement modules 132 so that each enforcement module 132 gets only the management instructions relevant to its operation. Here, the segmentation server 120 may determine which rules are relevant to a given enforcement module 132 and distribute the relevant rules to that enforcement module 132. A rule may be deemed relevant to an enforcement module 132 on a particular host 130 if that host 130 executes one or more workloads 138 that belongs to a group (defined by one or more label sets) referenced by the rule and the enforcement module 132 on the host 130 is configured to enforce that particular rule. A rule may be deemed relevant to an enforcement module 132 on a particular network midpoint device 180 if that network midpoint device 180 is upstream from a host 130 executing one or more workloads 138 that belongs to a group (defined by one or more label sets) referenced by the rule and the enforcement module 132 on the network midpoint device 180 is configured to enforce that particular rule. The segmentation server 120 may furthermore determine which membership information is relevant to each enforcement module 132 and distribute the relevant membership information to each respective enforcement module 132. Here, membership information may be relevant to a particular enforcement module 132 if it defines membership of a group referenced by a rule deemed relevant to the particular enforcement module 132.

The segmentation policy may furthermore include rules that specify virtual patches that patch a particular vulnerability associated with an application executed by one or more workloads 138. The virtual patches may be enforced in a distributed manner by one or more enforcement modules 132. A virtual patch may operate to block certain communications to or from an application that meet a specified set of criteria that may be indicative of an attempt to exploit the vulnerability without blocking all communications to or from the application. A virtual patch may furthermore perform filtering to restrict access to certain services or data that is not necessarily related to a known vulnerability. The virtual patch may apply application layer filtering (layer 7 filtering) that filters data packets based on their application layer data or based on application signature, version, application protocol version used by the application, or other information associated with the application. By analyzing high layer components of data packets, the virtual patch can intelligently determine and block specific data packets that represent a security risk while passing through data packets that do not appear to represent a risk.

The rules pertaining to virtual patches may be configured and distributed to enforcement modules 132 using label-based rules. For example, a rule may instruct an enforcement module 132 association with one or more workloads 138 having a specified label set to apply a virtual patch patching an application associated with the workload 138. This enables virtual patches to be efficiently deployed throughout a substantial number of workloads 138 based on their labels, without independently configuring patches for each individual workload 138. The enforcement modules 132 may dynamically instantiate or remove the virtual patch depending on the specific applications being executed by the workload 138 it controls and whether or not the virtual patch is relevant. For example, if a virtual patch is relevant to a specific version of an application, and the application is updated on the workload 138, the enforcement module 132 may identify that the virtual patch no longer applies and remove it to avoid wasting unnecessary computing resources. Furthermore, if labels assigned to workloads are updated or if the segmentation policy is updated, virtual patches may be automatically deployed or removed consistent with the updated labels and segmentation policy in an efficient manner that does not require manually updating individual workloads 138.

In an embodiment, the enforcement modules 132 may stores logs of traffic that is blocked or allowed to pass through to or from a workload 138. The segmentation server 120 may receive the traffic logs from the enforcement modules 132 and may generate a graphical representation of the connections being allowed and connections being blocked. The segmentation server 120 may furthermore indicate in the graphical representation which workloads 138 are implementing virtual patches and how those patches affect traffic to or from the applications. Furthermore, the segmentation server 120 can update the segmentation policy based on the observed communications (e.g., to permit only communications that observed under normal operation so as to prevent anomalous communications that may be malicious).

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy. The interface may furthermore enable the administrator to obtain various information about the hosts 130 and workloads 138 on the network 120 and view traffic flows between the workloads 138.

Figure 2:
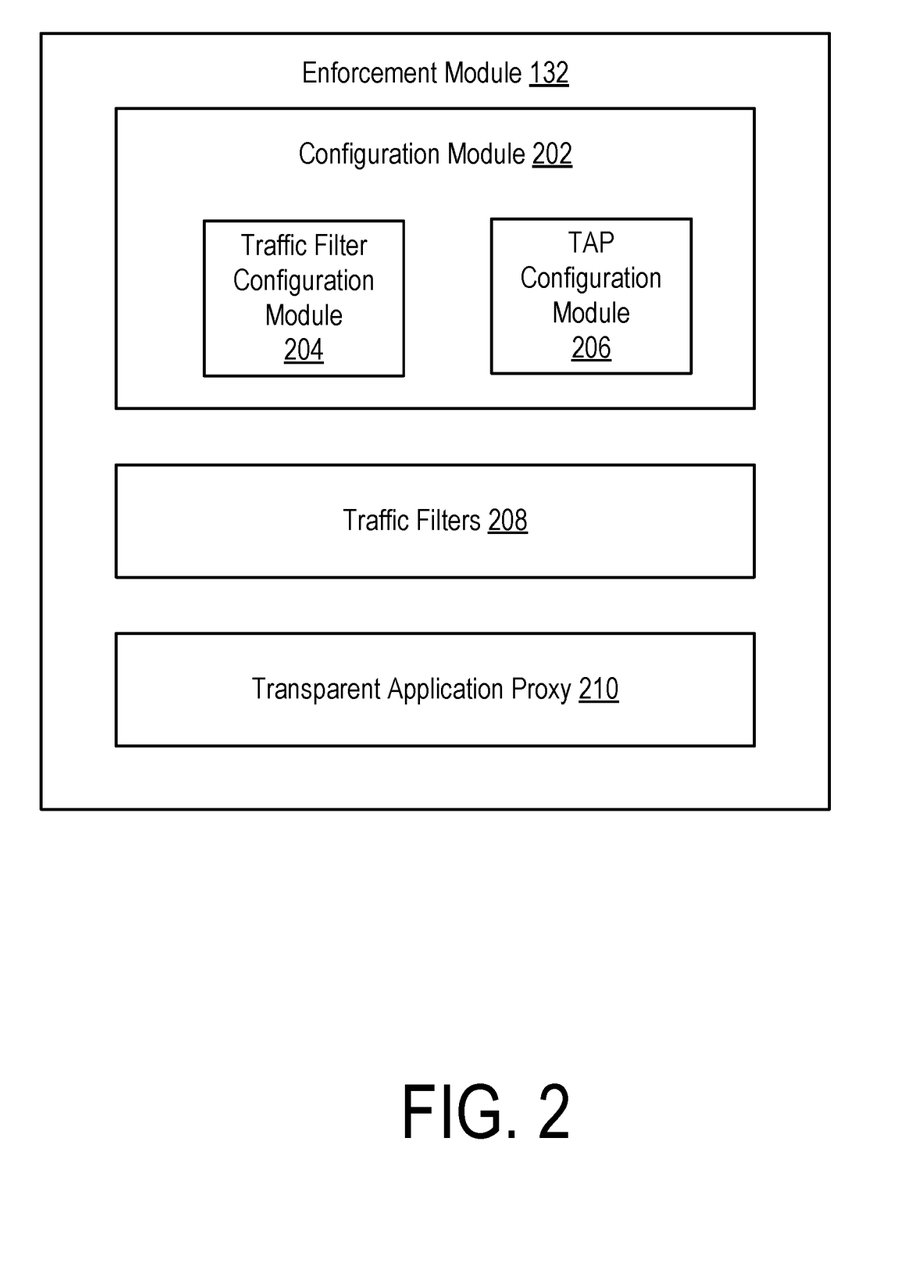
FIG. 2 is a block diagram illustrating an example embodiment of an enforcement module.

FIG. 2 illustrates an example embodiment of an enforcement module 132. The enforcement module 132 comprises a configuration module 202 including a traffic filter configuration module 204 and a transparent application proxy configuration module 206, one or more traffic filters 208, and a transparent application proxy 210. In alternative embodiments, the enforcement module may include different or additional modules. The various components of the enforcement module 132 may be implemented as one or more processors and a non-transitory computer-readable storage medium that stores instructions executed by the one or more processors to carry out the functions attributed to the enforcement module 132 described herein.

The traffic filters 208 operates to enforce the segmentation policy with respect to a workload 138 executing on a host 130. In an embodiment, the traffic filters 208 apply a set of packet filtering rules that block or allow communications to a particular destination address based on the source address and specific criteria associated with the communications such as the ports and protocols associated with the communications and a connection state. In an embodiment, the rules applied by the traffic filters 208 are generally permissive rules (e.g., a white list) that specify which specific communications are permitted. A default rule may cause the traffic filters 208 to block communications (e.g., drop packets) that do not match any of the permissive rules. The traffic filters 208 may furthermore monitor and report or log the results of applying the filtering rules to communications it receives. For example, the traffic filters 208 may report (directly or indirectly via another module) to the segmentation server 120 whenever a received communication is permitted or denied by the traffic filters 208.

In an embodiment, the traffic filters 208 may comprise an operating system-level firewall such as a Linux kernel firewall based on iptables or Netfilter modules or a Windows firewall based on a Windows Filtering Platform. Furthermore, the traffic filters 208 may comprise an Internet Protocol security (IPsec) engine that controls encryption and decryption of packets.

The transparent application proxy 210 comprises one or more application layer filters that operate to enforce a virtual patch for an application. The application layer filters may operate to monitor, block, and report certain communications to or from an application that meet a specified set of criteria indicative of an attempt to exploit the vulnerability without necessarily blocking all communications to or from the application. For example, a virtual patch may analyze bi-directional HTTP traffic and apply application layer filtering (layer 7 filtering) that filters data packets based on their application layer data. For example, the in the context of a database application such as MySQL, the virtual patch may analyze SQL statements going to the MySQL database server and filter certain statements without necessarily blocking all communications to and from the database server. The virtual patch may perform filtering at the web application level or at other levels for other types of applications.

In an embodiment, the traffic filters 208 are configured such that only certain communications are passed to the transparent application proxy 210 for further filtering, while other communications may be passed directly to the destination without passing through the transparent application proxy 210 or may be dropped by the traffic filters 208. Thus, for example, the traffic filters 208 may be configured to direct data packets to or from certain applications to a transparent application proxy 210 that operates to apply a virtual patch for the application.

The traffic filter configuration module 204 receives management instructions from the segmentation server 120 and translates the management instructions from a high level of abstraction to a low level of abstraction to configure the traffic filters 208. For example, for a given rule that permits communication between a workload 138 and a group of other workloads 138 having a specified label set, the traffic filter configuration module 204 determines workload identifiers for each of the workloads 138 having the specified label set, and configures the traffic filters 208 to permit communications with the identified workloads 138 in accordance with any restrictions (e.g., ports and protocols) specified in the given rule. If a transparent application proxy 210 is configured for an application, the traffic filter configuration module 204 may furthermore configure the traffic filters 208 to redirect traffic to or from the application to the transparent application proxy 210 to enable enforcement of the virtual patch.

The transparent application proxy configuration module 206 obtains management instructions from the segmentation server 120 relating to configuration of a virtual patch for an application executed by a workload 138 associated with the enforcement module 132. The transparent application proxy configuration module 206 may instantiate a new transparent application proxy 210 in response to receiving a configuration for a virtual patch when a transparent application proxy 210 is not already present to implement the virtual patch. In other scenarios, the transparent application proxy configuration module 206 may remove a transparent application proxy 210 when a virtual patch is no longer applicable. For example, the transparent application proxy configuration module 206 may remove a transparent application proxy 210 in response to a change in the segmentation policy, a change in a label set associated with the workload 138, a change in the applications executed by the workload 138, or a change in a version, application protocol, or other information relating to the application. In one embodiment, the transparent application proxy configuration module 206 may receive a set of virtual patches from the segmentation server 120 and determine which ones, if any, are relevant to apply depending on the application information associated with the application being executed by the workload 138. Alternatively, the transparent application proxy configuration module 206 can report the application information for the applications being executed to the segmentation server 120, and the segmentation server 120 may provide a virtual patch configuration specific to the application information.

In an embodiment, both the traffic filters 208 and the transparent application proxy 210 may monitor and report processed traffic to the segmentation server 120 to enable the segmentation server 120 to present information relating to the observed traffic and/or update the segmentation policy accordingly.

Figure 3:
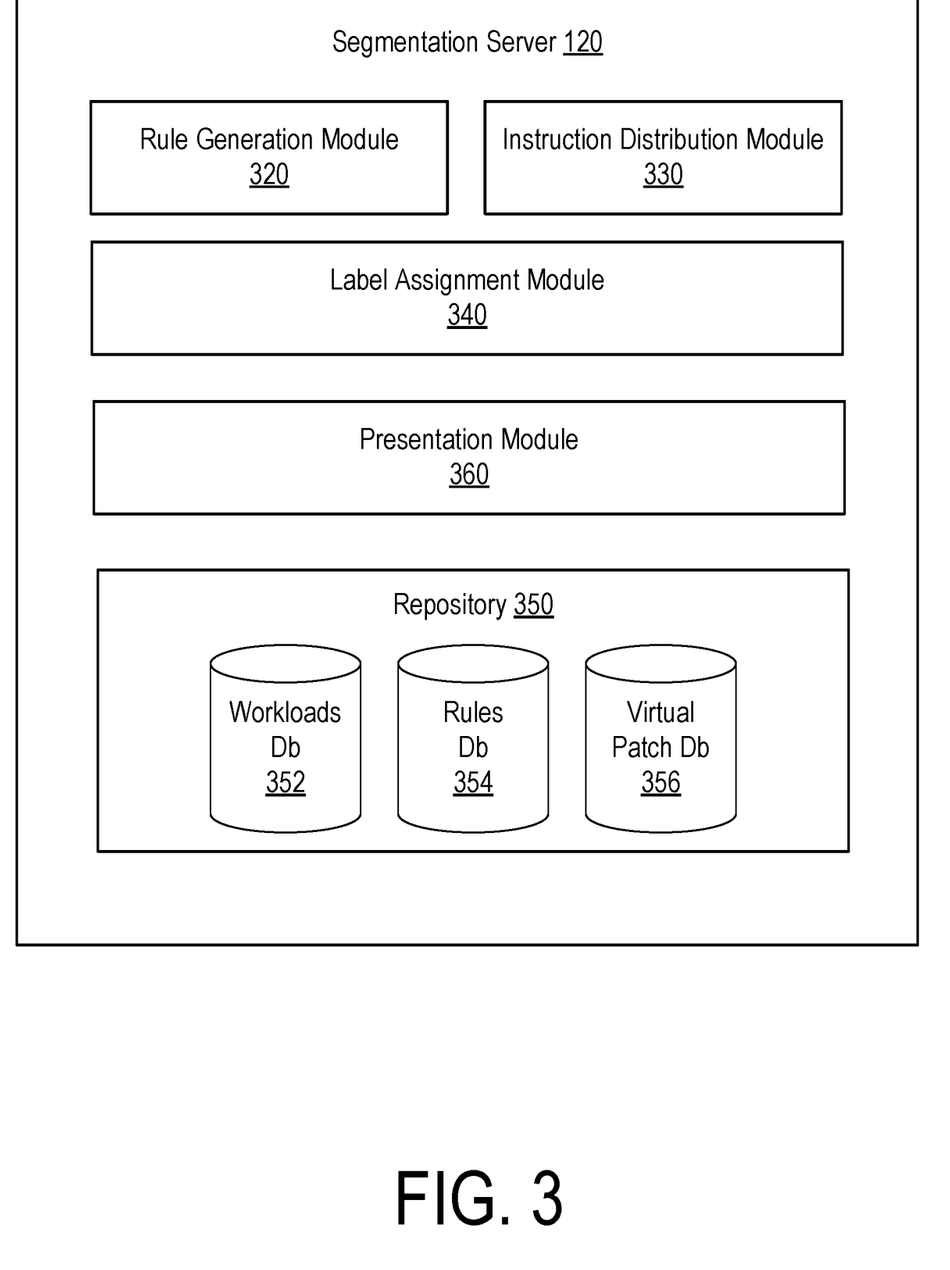
FIG. 3 is a block diagram illustrating an example embodiment of a segmentation server.

FIG. 3 is a high-level block diagram of an embodiment of a segmentation server 120. The segmentation server 120 comprises a label assignment module 340, a rule generation module 320, an instruction distribution module 330, a presentation module 360, and a repository 350. The repository 350 may comprise a workloads database 352 that stores associations between workloads 138 and their respective label sets, a rules database 354 that stores a segmentation policy as a set of rules, and a virtual patching database 356 that stores patch information associated with one or more applications. In alternative embodiments, the segmentation server 120 may include different or additional components. The various components of the segmentation server 120 may be implemented as one or more processors and a non-transitory computer-readable storage medium that stores instructions executed by the one or more processors to carry out the functions attributed to the segmentation server 120 described herein.

The label assignment module 340 facilitates assignment of labels to workloads 138. For example, the label assignment module 340 may assign labels based on a set of configurable label assignment rules that may be managed by an administrator via the administrative client 160. Alternatively, labels for individual workload 138 may be manually assigned by an administrator. Labels may be updated dynamically based on changing characteristics of workloads 138.

The rule generation module 320 automatically generates or updates a segmentation policy comprising a set of rules. The rules may be manually configured by a system administrator or may be generated automatically based on various predefined segmentation strategies. The rule generation module 320 may furthermore facilitate patching of applications executing on the workloads 138 based on information in the virtual patch database 356. In an embodiment, patches may be assigned based on administrator input or may be assigned automatically based on a set of known vulnerabilities affecting applications present in the administrator domain 150 based on the application versions, application protocols, or other application information.

The instruction distribution module 330 distributes instructions to the enforcement modules 132 to enable the enforcement modules 132 to enforce the rules, including segmentation rules and virtual patches. In an embodiment, the instruction distribution module 330 determines which rules are relevant to different enforcement modules 132 depending on the labels of the workloads 138 associated with each enforcement module 132 and distributes only relevant rules to each enforcement module 132. Thus, different enforcement modules 132 may receive different subsets of the rules depending on which workloads 138 are associated with them. For rule that specify enforcement of a virtual patch, the instruction distribution module 330 may obtain application information relating to the applications executed by each workload 138 and distribute the virtual patches to the appropriate enforcement modules 132 to enable patching of the applications. In one embodiment, the instruction distribution module 330 distributes virtual patches to enforcement modules 132 associated with any workloads 138 executing an application for which a virtual patch is available, and the enforcement module 132 controls whether or not to apply the virtual patch based on the specific application information. In an alternative embodiment, the instruction distribution module 330 obtains the application information and distributes virtual patches only if the virtual patch is relevant given the application information.

The instruction distribution module 330 may dynamically update instructions sent to the enforcement modules 132 in response to changes in the segmentation policy, changes to available patches, changes to the labels of particular workloads 138, changes to the applications executing on the workloads 138, or changes to application information associated with the applications. For example, if a particular workload 138 executes an application that is upgraded to a new version, the instruction distribution module 330 may receive a status update indicative of the new version of the application being installed and may remove or update a previously established virtual patch if it is no longer applicable to the new version of the application.

The presentation module 360 interfaces with the administrative client 160 to present a user interface enabling an administrator to view a representation of the traffic flows generated by the traffic flow module 412 and view, create, or modify rules associated with the segmentation policy including rules applying virtual patches to applications executing on the workloads 138. For example, the presentation module 360 may generate a graphical interface representing all or a portion of the traffic flow graph with the workloads 138 illustrated as nodes and the traffic flows illustrated as edges connecting relevant nodes. An administrator may select a particular node to view information about the corresponding workload 138 (e.g., an identifier for the workload, a label set for the workload, services provided by or consumed by the workload, etc.). An administrator may similarly select a particular edge on the graph to view information about the corresponding traffic flow such as, for example, services associated with the traffic flow, ports and protocols associated with the traffic flow, statistical information associated with the traffic flow, or whether or not virtual patches are applicable to the traffic flow.

Figure 4:
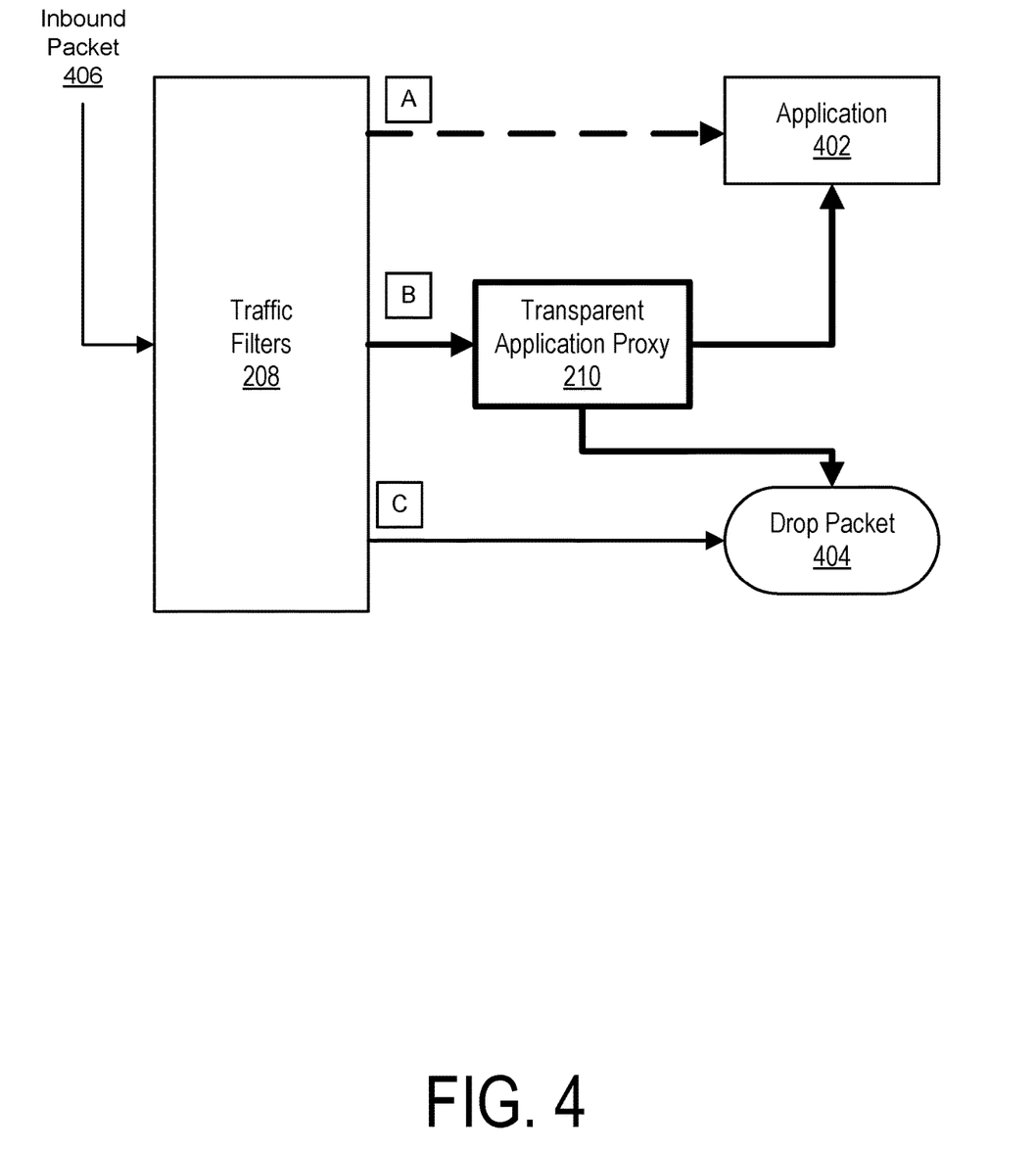
FIG. 4 is a block diagram illustrating an embodiment of data path for an inbound packet to an application.

FIG. 4 illustrates an example of the possible paths (labeled A, B, and C) for an inbound data packet 406 from a network source destined for an application 402. The traffic filters 208 are applied to the inbound data packet 406 to identify a filtering rule applicable to the inbound packet 406 based on the source and destination addresses, ports, protocols, or other packet filtering criteria associated with the inbound data packet 406. The traffic filters 208 perform filtering based on network layer data associated with the data packet 406. The identified applicable filtering rule may specify one of three actions to apply to the inbound data packet 406. Under path A, the applicable filtering rule may specify passing the inbound data packet 406 directly to the application 402. Under path B, the filtering rule may specify passing the inbound packet 406 to a transparent application proxy 210 for further processing. Under path C, the filtering rule may specify that the inbound data packet 406 should be directly dropped 404. If the inbound data packet 406 is passed to the transparent application proxy 210, the transparent application proxy 210 applies the application layer filter to determine, based on the application layer data, whether to pass the inbound packet 406 to the application 402 or drop 404 the inbound data packet 406.

Figure 5:
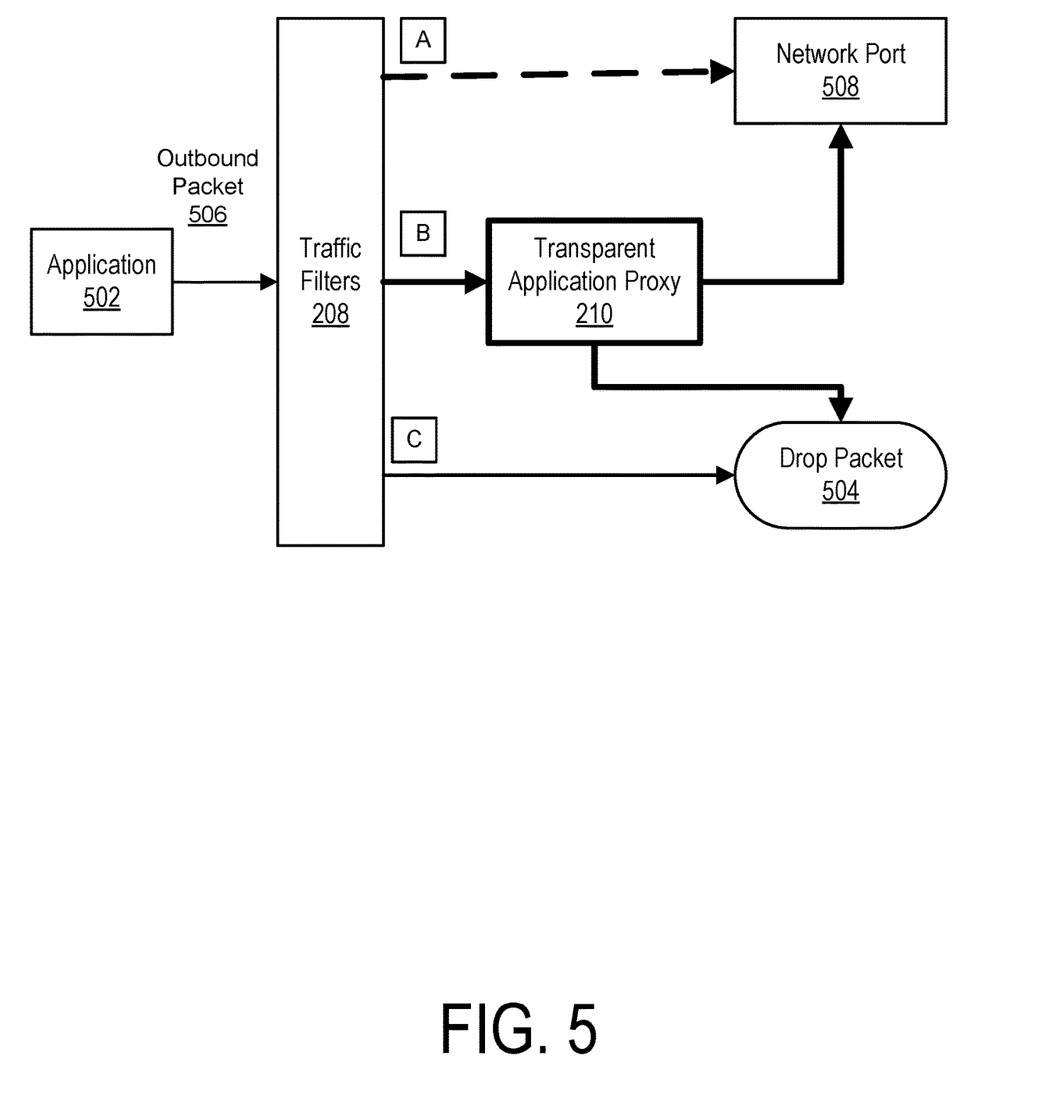
FIG. 5 is a block diagram illustrating an embodiment of data path for an outbound packet from an application.

FIG. 5 illustrates an example of the possible paths (labeled A, B, and C) for an outbound packet 506 from an application 502 destined for a network port 508. The traffic filters 208 are applied to the outbound data packet 506 to identify a filtering rule applicable to the outbound data packet 506 based on the source and destination addresses, ports, protocols, or other network layer criteria associated with the outbound data packet 506. The identified applicable filtering rule may specify one of three actions to apply to the outbound data packet 506. Under path A, the applicable filtering rule may specify passing the outbound data packet 506 directly to the network port 508. Under path B, the filtering rule may specify passing the outbound data packet 506 to the transparent application proxy 210 for further processing. Under path C, the filtering rule may specify that the outbound data packet 506 should be directly dropped 504. If the outbound data packet 506 is passed to the transparent application proxy 210, the transparent application proxy 210 applies the application layer filter to determine, based on the application layer data, whether to pass the outbound data packet 506 to the network port 508 or drop 504 the outbound data packet 506.

Figure 6:
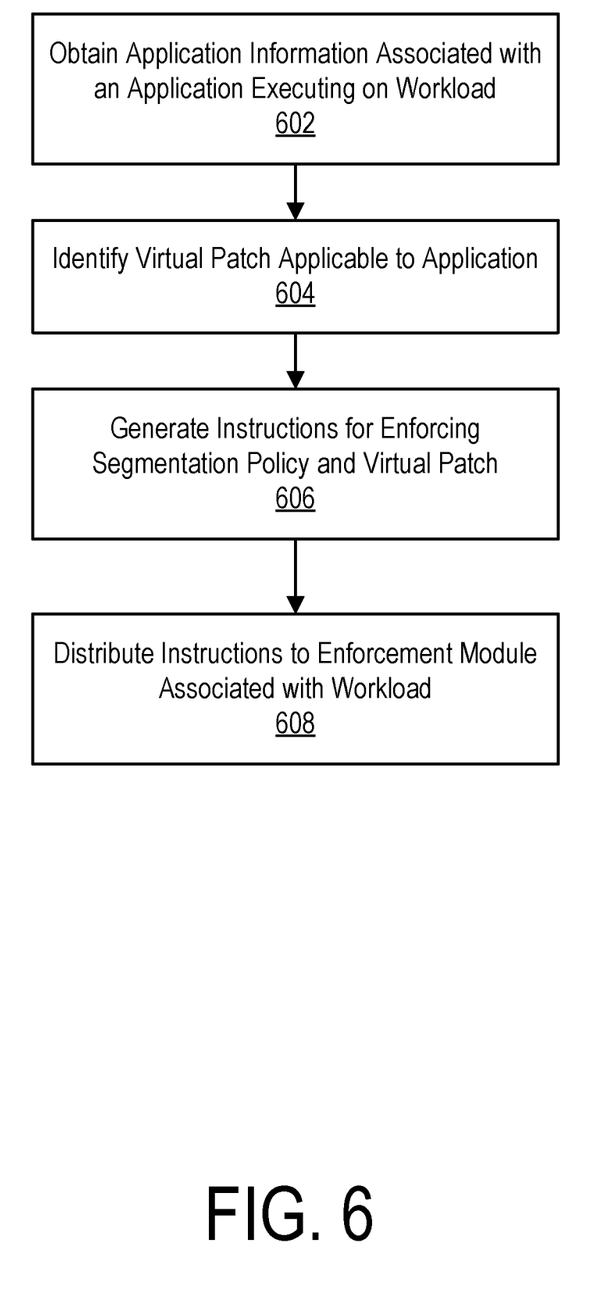
FIG. 6 is a flowchart illustrating an example embodiment of a process for generating and distributing management instructions for enforcing a segmentation policy that includes a virtual patch.

FIG. 6 is a flowchart illustrating an example embodiment of a process for distributing instructions associated with enforcement of a segmentation policy that includes virtual patches. A segmentation server 120 obtains 602 application information associated with an application executing on a workload 138. The application information may include, for example, an identifier for the application, a version of the application, an application protocol associated with the application, or other information relevant to determining whether a patchable vulnerability associated with the application exists. The segmentation server 120 identifies 604 a virtual patch applicable to the application. For example, the segmentation server 120 may identify the virtual patch based on manual input from an administrator or based on a prepopulated list of virtual patches applicable to different applications. The segmentation server 120 generates 606 instructions for enforcing the segmentation policy including instructions for implementing the virtual patch. The instructions may be generated based on the segmentation policy and the labels associated with the workload 138. The segmentation server 120 distributes 608 the instructions to an enforcement module 132 associated with the workload 138 executing the application to enable the enforcement module 132 to implement the segmentation policy including the virtual patch. The process of FIG. 6 may be performed with respect to each workload 138 in the administrative domain 150 to distribute relevant instructions to each enforcement module 132 that enables each enforcement module 132 to enforce the segmentation policy including virtual patches with respect to each associated workload 138. Furthermore, the process of FIG. 6 may be repeated when changes occur to the available patches, rules, labels, executing applications, or application information. These dynamic updates may result in transparent application proxies 210 being newly instantiated, removed, or updated depending on the configuration.

Figure 7:
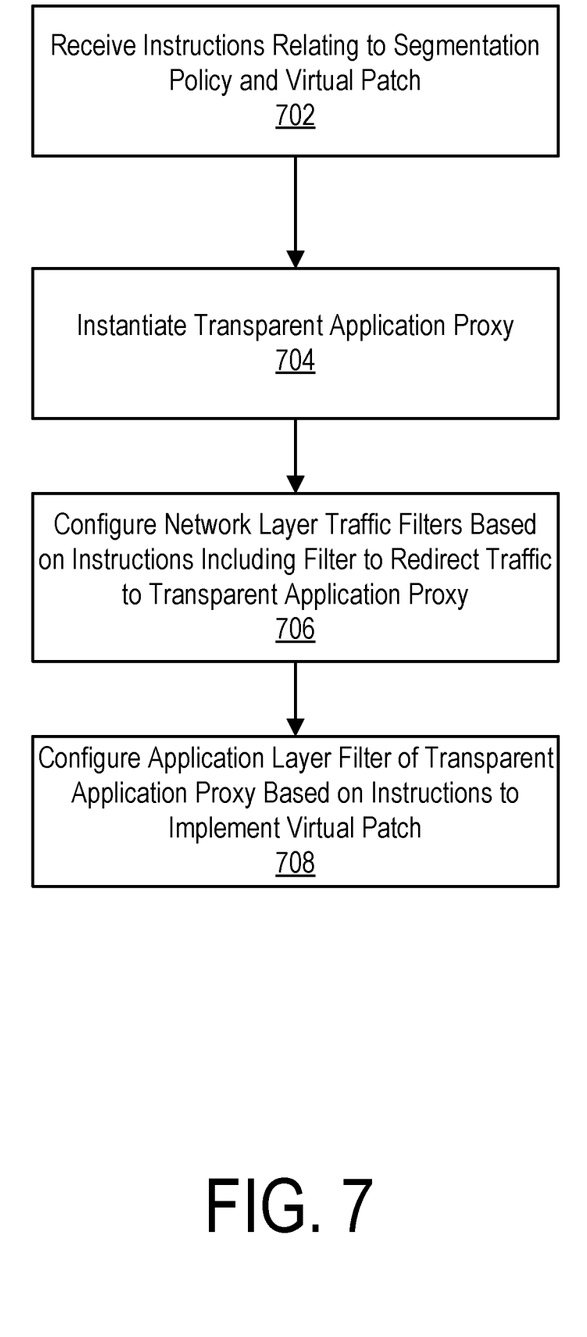
FIG. 7 is a flowchart illustrating an example embodiment of a process for configuring an enforcement module to enforce a segmentation policy that includes a virtual patch.

FIG. 7 illustrates an example embodiment of a process for configuring an enforcement module 132 to enforce a segmentation policy including a virtual patch. The enforcement module 132 receives 702 instructions from the segmentation server 120 relating to the segmentation policy and including one or more virtual patches. The enforcement module 132 instantiates 704 a transparent application proxy (if not already present) to enforce the virtual patch in accordance with the management instructions from the segmentation server 120. The enforcement module 132 furthermore configures 706 network layer traffic filters based on the instructions to enforce the segmentation policy. At least one of the filters is configured to redirect traffic to the transparent application proxy 210 when it detects packets to or from the application being patched. An application layer filter of the transparent application proxy 210 is also configured 708 based on the instructions to implement the virtual patch. Here, the application layer filter filters traffic through the transparent application proxy 210 based on application layer data associated with the data packets in order to patch a specific vulnerability associated with the application. As described above, the enforcement module 132 may dynamically update the configuration to add, remove, or update the transparent application proxy 210.

Figure 8:
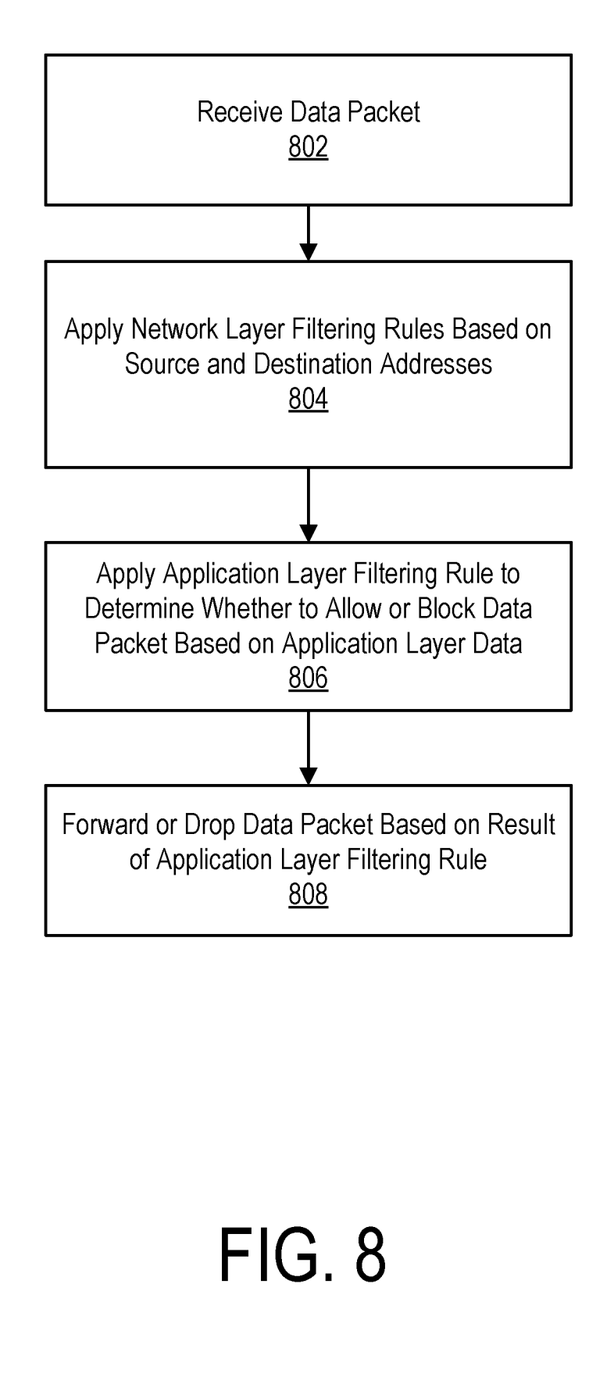
FIG. 8 is a flowchart illustrating an example embodiment of a process of enforcing a segmentation policy that includes a virtual patch.

FIG. 8 illustrates an example embodiment of a process for enforcing a segmentation policy that includes one or more virtual patches. An enforcement module 132 receives 802 a data packet to or from an application for which a virtual patch is configured. The enforcement module applies 804 network layer filtering rules that are based on the source and destination addresses associated with the data packet (and optionally network layer criteria such as ports and protocols) to either drop the data packet, pass the data packet to the destination address, or redirect the data packet to the transparent application proxy in the case that the data packet is to or from an application for which a virtual patch is configured. For data packets redirected to the transparent application proxy, an application layer filtering rule is applied 806 to determine, based on application layer data associated with the data packet, whether to allow or block the data packet. The transparent application proxy forwards or drops 808 the data packet based on a result of the application layer filtering rules.

In other additional embodiments, the systems and methods described above can be employed to implement a transparent application proxy that applies an application layer filter for another purpose that does not necessarily relate to a virtual patch for a specific known vulnerability. For example, the transparent application proxy may apply an application layer filter that implements a general security function such as restricting access of an application to certain data, restricting access of an external host to certain types of application data, restricting access of a workload to API or URL endpoints provided by an application, restricting ability of an application to post or subscribe to message queues, or restricting availability of certain functions performed by the application. In this embodiment, a label-based rule may be specified at the segmentation server 120 to apply a security function associated with an application that can be implemented using an application layer filter. The segmentation server 120 distributes instructions to enforcement modules 132 associated with workloads 138 executing applications to which the security function is applicable. The enforcement modules 132 then instantiates or updates a transparent application proxy to implement the application layer filter associated with the security function and redirects traffic through the transparent application proxy. Filtering rules may also be updated to redirect communications to or from the application to the transparent application proxy based on the source and destination address, ports, protocols, or other network layer criteria in the same manner described above.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for configuring an enforcement module on a host device to enforce a segmentation policy including a virtual patch for patching an application to protect against one or more security vulnerabilities, the method comprising:
receiving, from a segmentation server at a distributed enforcement module remote from the segmentation server, management instructions for enforcing a segmentation policy with respect to a subset of workloads in a network domain, the management instructions including access control rules for controlling permissible connections of the subset of workloads in the network domain, and the access control rules including at least one virtual patch rule for applying a virtual patch to traffic to or from an application executed by the subset of workloads managed by the enforcement module;
responsive to receiving the virtual patch rule, instantiating by the distributed enforcement module, a transparent application proxy on the host device for implementing the virtual patch and configuring the transparent application proxy to implement an application layer filter that blocks at least a subset of the traffic to or from the application in a manner that prevents exploitation of the one or more security vulnerabilities; and
responsive to receiving the access control rules, configuring a traffic filter on the host device based on the access control rules to filter traffic based on network layer data including source and destination addresses and to redirect at least a subset of the traffic to or from the application to the transparent application proxy;
applying the traffic filter and the transparent application proxy to enforce the segmentation policy;
responsive to determining that the virtual patch is no longer applicable to the subset of workloads managed by the enforcement module under the segmentation policy, removing the transparent application proxy from the host device.

2. The method of claim 1, wherein instantiating the transparent application proxy comprises:
detecting that the transparent application proxy is not present on the host device to enforce the virtual patch; and
instantiating the transparent application proxy responsive to the detection.

3. The method of claim 1, wherein removing the transparent application proxy comprises:
detecting an update to application information associated with the application;
transmitting the update to the segmentation server;
responsive to transmitting the update, receiving from the segmentation server, updated instructions for removing the virtual patch;
removing the transparent application proxy in response to the updated instructions; and
updating the traffic filter to remove the filtering rule redirecting the traffic to or from the application to the transparent application proxy.

4. The method of claim 1, wherein removing the transparent application proxy comprises:
detecting an update to application information associated with the application;
determining that the virtual patch is not applicable to the application based on the updated application information;
responsive to determining that the virtual patch is not applicable, removing the transparent application proxy; and
updating the traffic filter to remove the filtering rule redirecting the traffic to or from the application to the transparent application proxy.

5. The method of claim 1, wherein applying the traffic filter and the transparent application proxy comprises:
receiving an inbound data packet having a source address associated with a network source and a destination address associated with the application;
applying the traffic filter to redirect the inbound data packet to the transparent application proxy based on the source address and the destination address matching a filtering rule of the traffic filter associated with enforcement of the virtual patch; and
applying the application layer filter at the transparent application proxy to determine whether to allow or block the inbound data packet based on application layer data associated with the inbound data packet.

6. The method of claim 5, further comprising:
dropping the inbound data packet responsive to determining to block the inbound data packet based on the application layer data.

7. The method of claim 5, further comprising:
forwarding the inbound data packet to the application responsive to determining to allow the inbound data packet based on the application layer data.

8. The method of claim 1, wherein applying the traffic filter and the transparent application proxy comprises:
receiving an outbound data packet having a source address associated with the application and a destination address associated with a network host;
applying the traffic filter to redirect the outbound data packet to the transparent application proxy based on the source address and the destination address matching a filtering rule of the traffic filter associated with enforcement of the virtual patch; and
applying the application layer filter at the transparent application proxy to determine whether to allow or block the outbound data packet based on application layer data associated with the outbound data packet.

9. The method of claim 1, wherein the traffic filter comprises an IP address-based traffic filter to filter the traffic based on source and destination IP addresses.

10. The method of claim 9, wherein the traffic filter is further configured to filter the traffic based on a port and protocol associated with the traffic.

11. A non-transitory computer-readable storage medium storing instructions for configuring an enforcement module on a host device to enforce a segmentation policy including a virtual patch for patching an application to protect against one or more security vulnerabilities, the instructions when executed by a processor causing the processor to perform steps including:

receiving, from a segmentation server at a distributed enforcement module remote from the segmentation server, management instructions for enforcing a segmentation policy with respect to a subset of workloads in a network domain, the management instructions including access control rules for controlling permissible connections of the subset of workloads in the network domain, and the access control rules including at least one virtual patch rule for applying a virtual patch to traffic to or from an application executed by the subset of workloads managed by the enforcement module;

responsive to receiving the virtual patch rule, instantiating by the distributed enforcement module, a transparent application proxy on the host device for implementing the virtual patch and configuring the transparent application proxy to implement an application layer filter that blocks at least a subset of the traffic to or from the application in a manner that prevents exploitation of the one or more security vulnerabilities; and responsive to receiving the access control rules, configuring a traffic filter on the host device based on the access control rules to filter traffic based on network layer data including source and destination addresses and to redirect at least a subset of the traffic to or from the application to the transparent application proxy;

applying the traffic filter and the transparent application proxy to enforce the segmentation policy;

responsive to determining that the virtual patch is no longer applicable to the subset of workloads managed by the enforcement module under the segmentation policy, removing the transparent application proxy from the host device.

12. The non-transitory computer-readable storage medium of claim 11, wherein instantiating the transparent application proxy comprises:

detecting that the transparent application proxy is not present on the host device to enforce the virtual patch; and instantiating the transparent application proxy responsive to the detection.

13. The non-transitory computer-readable storage medium of claim 11, wherein removing the transparent application proxy comprises:

detecting an update to application information associated with the application;

transmitting the update to the segmentation server;

responsive to transmitting the update, receiving from the segmentation server, updated instructions for removing the virtual patch; and removing the transparent application proxy in response to the updated instructions; and updating the traffic filter to remove the filtering rule redirecting the traffic to or from the application to the transparent application proxy.

14. The non-transitory computer-readable storage medium of claim 11, wherein removing the transparent application proxy comprises:

detecting an update to application information associated with the application;

determining that the virtual patch is not applicable to the application based on the updated application information;

responsive to determining that the virtual patch is not applicable, removing the transparent application proxy; and updating the traffic filter to remove the filtering rule redirecting the traffic to or from the application to the transparent application proxy.

15. The non-transitory computer-readable storage medium of claim 11, wherein applying the traffic filter and the transparent application proxy comprises:

receiving an inbound data packet having a source address associated with a network source and a destination address associated with the application;

applying the traffic filter to redirect the inbound data packet to the transparent application proxy based on the source address and the destination address matching a filtering rule of the traffic filter associated with enforcement of the virtual patch; and applying the application layer filter at the transparent application proxy to determine whether to allow or block the inbound data packet based on application layer data associated with the inbound data packet.

16. The non-transitory computer-readable storage medium of claim 15, the instructions when executed further causing the processor to perform steps including:

dropping the inbound data packet responsive to determining to block the inbound data packet based on the application layer data.

17. The non-transitory computer-readable storage medium of claim 15, the instructions when executed by the processor further causing the processor to perform steps including:

forwarding the inbound data packet to the application responsive to determining to allow the inbound data packet based on the application layer data.

18. The non-transitory computer-readable storage medium of claim 11, wherein applying the traffic filter and the transparent application proxy comprises:

receiving an outbound data packet having a source address associated with the application and a destination address associated with a network host;

applying the traffic filter to redirect the outbound data packet to the transparent application proxy based on the source address and the destination address matching a filtering rule of the traffic filter associated with enforcement of the virtual patch; and applying the application layer filter at the transparent application proxy to determine whether to allow or block the outbound data packet based on application layer data associated with the outbound data packet.

19. A computer system comprising:

one or more processors; and a non-transitory computer-readable storage medium storing instructions for configuring an enforcement module on a host device to enforce a segmentation policy including a virtual patch for patching an application to protect against one or more security vulnerabilities, the instructions when executed causing the one or more to perform steps including:

receiving, from a segmentation server at a distributed enforcement module remote from the segmentation server, management instructions for enforcing a segmentation policy with respect to a subset of workloads in a network domain, the management instructions including access control rules for controlling permissible connections of the subset of workloads in the network domain, and the access control rules including at least one virtual patch rule for applying a virtual patch to traffic to or from an application executed by the subset of workloads managed by the enforcement module;

responsive to receiving the virtual patch rule, instantiating by the distributed enforcement module, a transparent application proxy on the host device for implementing the virtual patch and configuring the transparent application proxy to implement an application layer filter that blocks at least a subset of the traffic to or from the application in a manner that prevents exploitation of the one or more security vulnerabilities; and responsive to receiving the access control rules, configuring a traffic filter on the host device based on the access control rules to filter traffic based on network layer data including source and destination addresses and to redirect at least a subset of the traffic to or from the application to the transparent application proxy;

applying the traffic filter and the transparent application proxy to enforce the segmentation policy;

responsive to determining that the virtual patch is no longer applicable to the subset of workloads managed by the enforcement module under the segmentation policy, removing the transparent application proxy from the host device.

20. The computer system of claim 19, wherein instantiating the transparent application proxy comprises:

detecting that the transparent application proxy is not present on the host device to enforce the virtual patch; and instantiating the transparent application proxy responsive to the detection.

\* \* \* \* \*